United States Patent [19]

Pakulski et al.

[11] Patent Number: 5,362,408
[45] Date of Patent: Nov. 8, 1994

[54] HIGH TEMPERATURE GEL STABILIZER FOR FRACTURING FLUIDS

[75] Inventors: Marek K. Pakulski; D. V. Satyanarayana Gupta, both of The Woodlands, Tex.

[73] Assignee: The Western Company of North America, Houston, Tex.

[21] Appl. No.: 912,983

[22] Filed: Jul. 14, 1992

[51] Int. Cl.$^5$ .............................................. E21B 43/26
[52] U.S. Cl. ................................. 252/8.551; 166/308
[58] Field of Search ....................... 252/8.551; 166/308

[56] References Cited

U.S. PATENT DOCUMENTS

| | | | |
|---|---|---|---|
| 3,084,057 | 4/1963 | Jordan | 106/205 |
| 3,551,349 | 12/1970 | Kallfass | 252/392 |
| 3,764,530 | 10/1973 | Burland et al. | 252/8.5 C |
| 4,278,635 | 7/1981 | Kerst | 422/14 |
| 4,282,111 | 8/1981 | Ciuba | 252/178 |
| 4,323,706 | 4/1982 | Bonfield et al. | 564/523 |
| 4,487,708 | 12/1984 | Muccitelli | 252/178 |
| 4,487,745 | 12/1984 | Weiss et al. | 422/16 |
| 4,556,492 | 12/1985 | Dickerson et al. | 210/668 |

FOREIGN PATENT DOCUMENTS 2527907 8/1976 Germany .

*Primary Examiner*—Gary Geist
*Attorney, Agent, or Firm*—Peter A. Bielinski

[57] ABSTRACT

The present invention relates to the use of oximes as thermal decomposition reduction additive for gels used in oil field drilling fluids, fluids used as proppant carriers and fluids used during well completion and workover.

10 Claims, No Drawings

HIGH TEMPERATURE GEL STABILIZER FOR FRACTURING FLUIDS

BACKGROUND OF THE INVENTION

1. Field of the Invention

The present invention relates to the use of oximes, especially methylethylketoxime, as thermal oxidative free radical decomposition prevention additives for gels used in oil field drilling fluids, fluids used as proppant carriers and fluids used during well completion and workover.

2. Description of the Prior Art

Sols formed when a soluble dispersible gum is mixed with water find use in a wide variety of industrial applications. In a significant number of these applications it is necessary that the sol be exposed to elevated temperatures for extended periods of time.

In oil field applications the sols may become hot in use, e.g. the use of brine sols as agents to control the fluid loss in gas or oil well drilling operations or as proppant carriers and as fluid loss control agents in well completion and workover.

Unfortunately when sols of water soluble gums are exposed to elevated temperatures for any extended length of time, they lose their viscosity in part or in whole and therefore become less effective or completely ineffective. Dissolved oxygen is the major cause of an oxidative free radical polymer breakdown leading to a deterioration of the fracturing gel at elevated temperatures. Therefore, to prevent a premature viscosity degradation, oxidation inhibitors or free radical scavengers are a necessary component of fracturing gels being used in hot wells.

The normal concentration of diluted oxygen in air saturated fresh water at 20° C. is about 35 g/1000 gallons which is approximately the equivalent of 1.5 lbs/1000 gal. of a typical oxidizing gel breaker. Even more oxygen is entrained in the gel and subsequently dissolved at high pressure when dry proppant is introduced into a blender and mixed with a gel. This diatomic oxygen is not very reactive at ambient pressure and temperature. However, its reactivity increases exponentially with temperature and pressure increase and becomes significant at high temperature or in deep wells.

Corrosion prevention in steam boilers makes a useful model for high temperature and high pressure fluids being pumped in oil field conditions. The strategy to control oxidation in both environments is to remove all of the molecular oxygen. The chemicals which are used to control oxygen are referred to as "oxygen scavengers". In boilers, the norm is to preheat water and to deaerate mechanically then add oxygen scavengers. In oil fields, oxygen scavengers are normally used without prior mechanical deaeration.

When first introduced, oxygen scavengers were seen as agents which "remove" dissolved oxygen. However, the "removal" of dissolved oxygen from water is actually a chemical reduction of zerovalent molecular oxygen to compounds in which this element appears in the lower $-2$ oxidation state. The reduced oxygen combines with an acceptor atom, molecule or ion to form an oxygen-containing compound. Hence, all oxygen scavengers are reducing agents, although not all reducing agents are necessarily oxygen scavengers.

To be suitable as oxygen scavenger, a reducing agent must satisfy the thermodynamic requirement of having an exothermic heat of reaction with $O_2$, a condition satisfied by most reducing agents, and the kinetic requirement of a reasonable reactivity at lower temperatures, a condition not satisfied by many.

A variety of new oxygen scavengers were patented in recent years for boiler applications and several are now in commercial use. These include hydroxylamine ($H_2NOH$) in the form of its salts and alkyl derivatives (U.S. Pat. No. 4,067,690), Hydroquinone (U.S. Pat. Nos. 4,278,635 and 4,282,111) and hydroquinone formulated with amines (U.S. Pat. No. 4,279,767), carbohydrazide ($H_2N$-$NH$-$CO$-$NH$-$NH_2$) as a substitute for toxic hydrazine (U.S. Pat. No. 4,269,717), ammonium erythroborate (U.S. Pat. No. 4,419,327), and methylethylketoxime (2-butanoneoxime) (U.S. Pat. No. 4,487,745).

In oil field fracturing operations, the kinetic requirements are very important. The oxygen scavenger has to remove available oxygen at low temperatures before it can damage vulnerable polysaccharides at higher temperatures. Oil field applicable oxygen scavengers must have a limited lifetime. They should be consumed in the course of a treatment so that they do not interfere with the after treatment gel breaking process. Most catalytic type, preventive antioxidants have a long life time and consequently do not qualify for oil field application.

Chemical incompatibility between reducing agents and crosslinkers creates another product choice limitation. Since all oxygen scavengers are reducing compounds, they are electron donors. Electron donors are Lewis bases capable of chelating metals which makes them unsuitable for application in metal crosslinked gels. Based on the above limitations, most common antioxidants have been rejected from oil field applications.

The most common gel stabilizer currently used in oil fields, sodium thiosulfate, can be oxidized to two products by two reactions. The first reaction, oxidation to tetrathionate, is fastest, least efficient and is usually the dominant reaction.

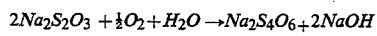

$$2Na_2S_2O_3 + \tfrac{1}{2}O_2 + H_2O \rightarrow Na_2S_4O_6 + 2NaOH$$

The second reaction, the oxidation to sulfate ion, requires high temperatures to occur and is usually not significant.

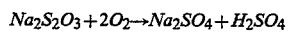

$$Na_2S_2O_3 + 2O_2 \rightarrow Na_2SO_4 + H_2SO_4$$

Twenty parts of sodium thiosulfate per part of oxygen are required for oxygen scavenging according to stoichiometry in the first reaction.

The oxidation reaction of methylethylketoxime is as follows:

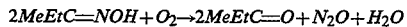

$$2MeEtC=NOH + O_2 \rightarrow 2MeEtC=O + N_2O + H_2O$$

Only 5.5 parts of methylethylketoxime per part of oxygen are necessary and therefore methylethylketoxime is almost 4 times more efficient than sodium thiosulfate for oxygen scavenging.

SUMMARY OF THE INVENTION

The present invention relates to a composition and a process for the substantial reduction of thermal degradation of aqueous gels by the addition of an oxime preferably methylethylketoxime.

DETAILED DESCRIPTION OF THE INVENTION

It has been discovered that oximes including ketoximes and aldoximes, particularly methylethylketoxime (2-butanoneoxime) are useful for extending the high temperature effectiveness of aqueous gels commonly used in oil field operations. It has been found that oximes prevent the thermal degradation of such gels at temperatures above 100° C. and as high as 200° C. or higher. The reaction kenetics are fast enough even at low temperatures to stabilize such gels. The reaction of methylethylketoxime with oxygen yields methylethylketone, nitrous oxide and water which indicates a theoretical requirement of only 5.5 parts of methylethylketoxime per part of oxygen. Other oximes will be effective in the method of the present invention including ketoximes and aldoximes especially, dimethylketoxime, diethylketoxime, ethylpropylketoxime, acetaldoxime, butyraldoxime and the like.

The amount of an oxime needed to stabilize a gel will be an effective amount depending on the amount of oxygen present in the gel and the gels subsequent exposure to atmospheric oxygen, for example, during blending with a proppant. The amount of an oxime employed according to the present invention will therefore be that necessary to scavenge the oxygen existing in any particular situation, plus some excess so as to maintain a small residual amount of additive while stabilization is needed. Normally, about five to six parts by weight of methylethylketoxime will be required to remove one part by weight of dissolved oxygen. In practice, however, an excess of an oxime will be employed to assure a fast and complete oxygen removal. The amount of an oxime will usually be measured in terms of the amount of gel being treated. Typical loadings of methylethylketoxime may vary from 0.01 parts per thousand by weight to 100 parts per thousand, preferably, 0.1 part per thousand to 20 parts per thousand, and most preferably, from 0.5 parts per thousand to 10 parts per thousand.

Available literature information indicate that the reaction of oximes including methylethylketoxime with oxygen is temperature dependent but unusual in comparison to other oxygen scavengers in that their reactivity is relatively independent of pH. This characteristic makes the oximes very universal oxygen scavengers/gel stabilizers for oil field applications at basic or acidic conditions.

The gels which can be used with the thermal decomposition reduction additive of the present invention include all gels formed when a soluble dispersible gum is mixed with water. These gels can include galactomannan gums and their derivatives, glucomannan gums and their derivatives, guar gum, locust bean gum, cara gum, carboxymethyl guar, hydroxyethyl guar, hydroxypropyl guar carboxymethylhydroxyethyl guar, carboxymethylhydroxypropyl guar, cellulose and its derivatives, hydroxypropyl cellulose, hydroxymethyl cellulose, hydroxyethyl cellulose and carboxymethyl cellulose.

An oxime according to present invention can be added to the mix water prior to or at the same time as other additives are added to a water based oil field gel. An oxime could be added on-the-fly if necessary for continuous process operation.

EXAMPLES

The following examples further illustrate the invention and are for illustrative purposes only. The examples may obviously be modified without departing from the scope of this invention and the invention is not limited to the specific embodiments given.

In each of the examples given in Table 1, the gel, as described, was mixed with an antioxidant at a loading calculated to give the required oxygen scavenging. Samples of gel containing each of the antioxidants were tested for room temperature low pH crosslink time, room temperature high pH crosslink time, elevated temperature crosslink time and high temperature gel viscosity decrease with time.

The antioxidants were tested at room temperature to determine whether they would interfere with the metal crosslinker at low temperatures.

The elevated and high temperature tests were performed to demonstrate that the antioxidant would allow crosslinking to occur and actually stabilize the gel at high temperature.

The room temperature, low pH crosslink time was determined by adding about 1 gram of $NH_2SO_3H$ (sulfamic acid) buffer to 1 liter of 0.48% carboxymethylhydroxypropyl guar gel solution along with the antioxidant as given in the table. The pH was adjusted to about 3.5. 200 ml of the buffered stabilized gel was placed in a waring blender 500 ml cup and mixed using a 1-7/8 inch blade at about 25% of the maximum blender speed so that a vortex was created. 0.4 ml of TIC TM crosslinker containing $Ti^{+4}$ cations available from The Western Company of North America under the trade name TIC was added by syringe into the vortex and the time required to crosslink the gel was measured. The gel was considered crosslinked when the vortex in the blender closed completely and the surface of the gel stopped turning. The test was repeated two to four times and an average was calculated. The solutions were tested at 24° C.

The room temperature, high pH crosslink time was determined by adding 1 ml of 35% carbonate buffer solution to 1 liter of 0.48% hydroxypropyl guar gel solution along with the antioxidant as given in the table. The pH was adjusted to about 9.5. 200 ml of the buffered stabilized gel was placed in a waring blender 500 ml cup and mixed using a 1-7/8 inch blade at about 25% of the maximum blender speed so that a vortex was created. 0.2 ml of CL-14 TM crosslinker containing $Zr^{+4}$ cations available from The Western Company of North America under the trade name CL-14 was added by syringe into the vortex and the time required to crosslink the gel was measured. The gel was considered crosslinked when the vortex in the blender closed completely and the surface of the gel stopped turning. The test was repeated two to four times and an average was calculated. The solutions were tested at 24° C.

To determine the elevated temperature crosslink time the blender test and gels as in the room temperature, high pH crosslink time test were used. However, the gel solutions were preheated to between 49° C. and 55° C. prior to the test. Antioxidants which allowed crosslinking to occur in about four (4) minutes or less at room temperature were considered successful candidates and were not tested for elevated temperature crosslink time. Crosslink times at 55 ° C. for these antioxidants would be very fast occurring in about ten (10) seconds or less.

The high temperature gel viscosity test examined how rapidly the gel viscosity decreased at high temperatures. The test was performed as follows. A Fann model 50 C. viscometer with metal parts machined from histalloy was used. The R1/B1 rotor/bob combination was used. Gel samples prepared as in the room temperature high pH crosslink time procedure were loaded into the viscometer. The samples and viscometer were heated to 150° C. The viscosity was measured at 10.0 RPM (170 sec$^{-1}$) and monitored for rate of decrease. The gels containing an antioxidant passed the high temperature viscosity test if they retained the viscosity for about two hours longer than an unstabilized gel. Some antioxidants were not tested for high temperature gel viscosity since the high cost of the antioxidant made their use not economical.

TABLE I

| Exp. No. | Antioxidant | Loadings* | Room Temp Low pH Crosslink Time | Room Temp High pH Crosslink Time | Elevated Temperature Crosslink Time | High Temperature Gel Viscosity Test** |
|---|---|---|---|---|---|---|
| 1 | Na$_2$SO$_3$ | 2.5 ppt | 0:50 min | 4:10 min | | fail |
| 2 | NaSCN | 2.5 ppt | 0:40 min | 3:00 min | | fail |
| 3 | Na$_2$So$_3$/catalyst | 2.5 ppt | 1:00 min | >11 min | 10 sec @ 55° C. | fail |
| 4 | HONH$_2$ × HCl | 0.5 ppt | >10 min | >10 min | >10 min @ 49° C. | fail |
| 5 | N$_2$H$_4$ × HCl | 2.5 ppt | >10 min | >13 min | >10 min @ 49° C. | fail |
| 6 | Methylethylketoxime | 2 ppt | 0:40 min | 3:20 min | | pass |
| 7 | Hydroquinone | 0.5 ppt | 1:00 min | >10 min | 5 sec @ 49° C. | pass |
| 8 | t-Bu-hydroquinone | 0.5 ppt | 1:00 min | >14 min | 3 min @ 55° C. | pass |
| 9 | Di-t-Bu-hydroquinone | 0.5 ppt | 0:30 min | 2:55 min | 7 sec @ 52° C. | fail |
| 10 | Benzoquinone | 0.5 ppt | >10 min | >14 min | >10 min @ 52° C. | fail |
| 11 | Methyl Niclate | 0.5 ppt | 0:35 min | 3:00 min | | fail |
| 12 | NACAP | 0.6 ppt | 1:40 min | 3:00 min | | |
| 13 | Potassium ethyl xanthate | 1.2 ppt | 1:20 min | 3:00 min | | |
| 14 | Butyl Zimate | 1.2 ppt | 0:40 min | 3:00 min | | |
| 15 | AMA-331 | 5 ppt | 4:00 min | 4:00 min | | pass |
| 16 | Vancide 51 | 5 ppt | 4:00 min | 4:00 min | | |

*ppt = parts per thousand
**Fail = Gel's viscosity decrease rapidly Pass = Gel's viscosity decreased slowly
11  nickel dimethyldithiocarbamate - R.T. Vanderbilt Co., Inc., 30 Winfield St. Norwalk, CN 06855
12  2-mercaptobenzothiazole - R.T. Vanderbilt Co., Inc.
14  zinc di-n-butyldithiocarbamate - R.T. Vanderbilt Co., Inc.
15  AMA-331 mixture of disodiumethylene bisdithiocarbamate and sodium dimethyldithiocarbamate - Vinings Industries Inc. 3950 Cumberland Parkway Atlanta, GA 30339
16  mixture of sodium dimethyldithiocarbamate and sodium 2-mercaptobenzothiazolale - R.T. Vanderbilt Co., Inc.

Methylethylketoxime did not effect crosslinker performance at low temperature and was found to be an effective high temperature gel stabilizer applicable for oil field use.

While particular embodiments of the invention have been described, it is to be understood that such descriptions are presented for purposes of illustration only and that the invention is not limited thereto and that reasonable variations and modifications, which will be apparent to those skilled in the art can be made without departing from the spirit or scope of the invention.

What is claimed is:

1. A gelled oilfield fluid composition suitable as a high temperature fracturing fluid comprising:
    (a) water,
    (b) a water thickening amount of a soluble or dispersable polymer,
    (c) a crosslinker, and
    (d) an effective amount of an oxime gel stabilizer.

2. A composition according to claim 1 wherein said oxime is selected from the group consisting of ketoximes and aldoximes.

3. A composition according to claim 1 wherein said oxime is present in an amount of about 0.01 to 100 parts per thousand parts of gelled composition.

4. A composition according to claim 1, wherein said oxime is present in an amount of about 0.01 to 20 parts per thousand parts of gelled composition.

5. A composition according to claim 1, wherein said oxime is present in an amount of about 0.5 to 10 parts per thousand parts of gelled composition.

6. A composition according to claim 1, wherein said gelled composition has a pH of between 2 and 12.

7. A composition according to claim 13 wherein said oxime is present in an excess amount which is effective to provide a residual amount thereof in the gelled composition throughout the use of said gelled composition in oilfield fracturing, completion and workover operations.

8. A composition of claim 13 wherein said polymer is a polymer selected from the group of galactomannan gums and their derivatives, glucomannan gums and their derivatives, guar gum, locust bean gum, cara gum, carboxymethyl guar, hydroxyethyl guar, hydroxypropyl guar carboxymethylhydroxyethyl guar, carboxymethylhydroxypropyl guar cellulose, cellulose derivatives, hydroxypropyl cellulose, hydroxymethyl cellulose, hydroxyethyl cellulose and carboxymethyl cellulose.

9. A gelled oilfield fluid composition suitable as a high temperature fracturing fluid comprising:
    (a) water,
    (b) water thickening amount of a soluble or dispersable polymer,
    (c) crosslinker containing Zr$^{+4}$ and cations, and
    (d) an effective amount of a methylethylketoxime gel stabilizer.

10. A gelled oilfield fluid composition suitable as a high temperature fracturing fluid consisting essentially of:
    (a) water,
    (b) a water thickening amount of a soluble polymer,
    (c) a crosslinker,
    (d) an oxime gel stabilizer,
    (e) a buffer, and
    (f) a gel breaker.

* * * * *